United States Patent [19]

Baloche

[11] Patent Number: 5,096,261

[45] Date of Patent: Mar. 17, 1992

[54] SATELLITE FREE CONTINUOUS ARTICULATION WITH A TAKE-UP DEVICE

[75] Inventor: Francois Baloche, Flers, France

[73] Assignee: Bertrand Faure Automobile, Yvelines, France

[21] Appl. No.: 672,180

[22] Filed: Mar. 20, 1991

[30] Foreign Application Priority Data

Mar. 20, 1990 [FR] France .................. 90 03529

[51] Int. Cl.⁵ .............................................. F16H 1/32
[52] U.S. Cl. ..................................... 297/362; 475/170
[58] Field of Search .......................... 475/170; 297/362

[56] References Cited

U.S. PATENT DOCUMENTS

| | | | |
|---|---|---|---|
| 4,371,207 | 2/1983 | Wilking et al. | 297/362 X |
| 4,407,544 | 10/1983 | Bähring | 297/362 |
| 4,538,855 | 9/1985 | Peetz et al. | 297/362 |
| 4,582,360 | 4/1986 | Becker | 297/362 |
| 4,786,110 | 11/1988 | Mahling et al. | 297/362 |
| 4,986,602 | 1/1991 | Blanchard | 297/362 |

Primary Examiner—Dirk Wright
Attorney, Agent, or Firm—Robert W. Becker & Associates

[57] ABSTRACT

A dish is placed in a circular opening about a spindle comprising a central collar. The dish comprises a ball bearing retained by a cage. There is placed inside the dish, concentrically with respect to the spindle, two half-cams separated at the upper ends thereof by an arcuate spiral spring, while the two half cams have lower portions defining a space in which can move a finger rigidly connected to said central spindle containing an articulation control shaft so to form an assembly. The assembly enables, when mounted, passing over hard points by a displacement of the two half-cams one toward the other while compressing the spring under effect of a thrust imparted by the finger of one of the two half-cams. A casing is rigidly connected to the mobile flange for retaining the aforementioned member assembly while a lower and hollow guide rigidly connected to the fixed flange maintains a lower portion of the casing.

2 Claims, 3 Drawing Sheets

SATELLITE FREE CONTINUOUS ARTICULATION WITH A TAKE-UP DEVICE

OBJECT AND SUMMARY OF THE INVENTION

The object of the present invention is to provide a satellite-free continuous articulation adapted for being mounted on vehicle seats in order that the back seat of each seat can be adjustable in inclination. Moreover, this articulation comprises a play take-up device eliminating also the inherent hard points due to the cooperating toothings, the tolerance dimensions of which, in spite of the care taken when making the toothings, have imperfections which are detrimental on the one hand to the good operation of the articulation, and on the other hand to the comfort of the passenger using the seat in consideration.

It should also be pointed out that these continuous articulations have, on the one hand, a great resistance which increases thus the safety of the passenger when there is an impact, and are, on the other hand, simple to manufacture are therefore little costly, meeting thereby the requirements of the low grade or small town vehicle manufacturers.

Satellite free continuous articulations enabling an easy positioning of the seat back with respect to the sitting portion of a seat as such have been known for long, but all these satellite-free continuous articulations have the disadvantage of adding up the plays due to the manufacturing tolerances; the result being that the seat back is, on the one hand, difficult to set in inclination, and may, on the other hand, exhibit an upleasant instability phenomenon for the passenger seated on the seat.

The present invention remedies this disadvantage by providing a satellite-free continuous articulation including a play take-up device.

According to the invention, the satellite-free continuous articulation includes a play take-up device, wherein the articulation has a mobile flange which is rigidly connected to the seat back of a seat and has a central portion provided with a hollow stamped portion having a main border including a circular toothing adapted for cooperating with a toothing of smaller diameter carried by an outer portion of a central circular zone of a fixed flange of the articulation which is rigidly connected to the sitting portion of the seat, this central zone of the fixed flange being formed with a circular opening, and wherein a dish is placed in this circular opening about a spindle having a central collar, this dish comprising a ball bearing retained by a cage, then there is placed inside the dish and concentrically with respect to the spindle two half-cams separated at the upper ends thereof by an arcuate spiral spring, while the lower portions of the two half cams define a space in which can move a finger rigidly connected to the central spindle containing an articulation control shaft, so to form an assembly, this assembly enabling, when mounted, passing over the hard points by a displacement of the two half-cams one toward the other while compressing the spring under effect of a thrust imparted by the finger of one of the two half-cams, so as to reduce an excentricity α of the fixed flange toothing with respect to the mobile flange toothing, then finally a casing rigidly connected to the mobile flange retains the aforementioned member assembly while a lower hollow guide rigidly connected to the fixed flange maintains a lower portion of the casing.

Various other features of the invention will become more apparent from the following detailed description.

BRIEF DESCRIPTION OF THE DRAWINGS

An embodiment of the invention is shown by way of a non limiting example in the accompanying drawings, wherein.

BEST MODE OF CARRYING OUT THE INVENTION

Figure 1:
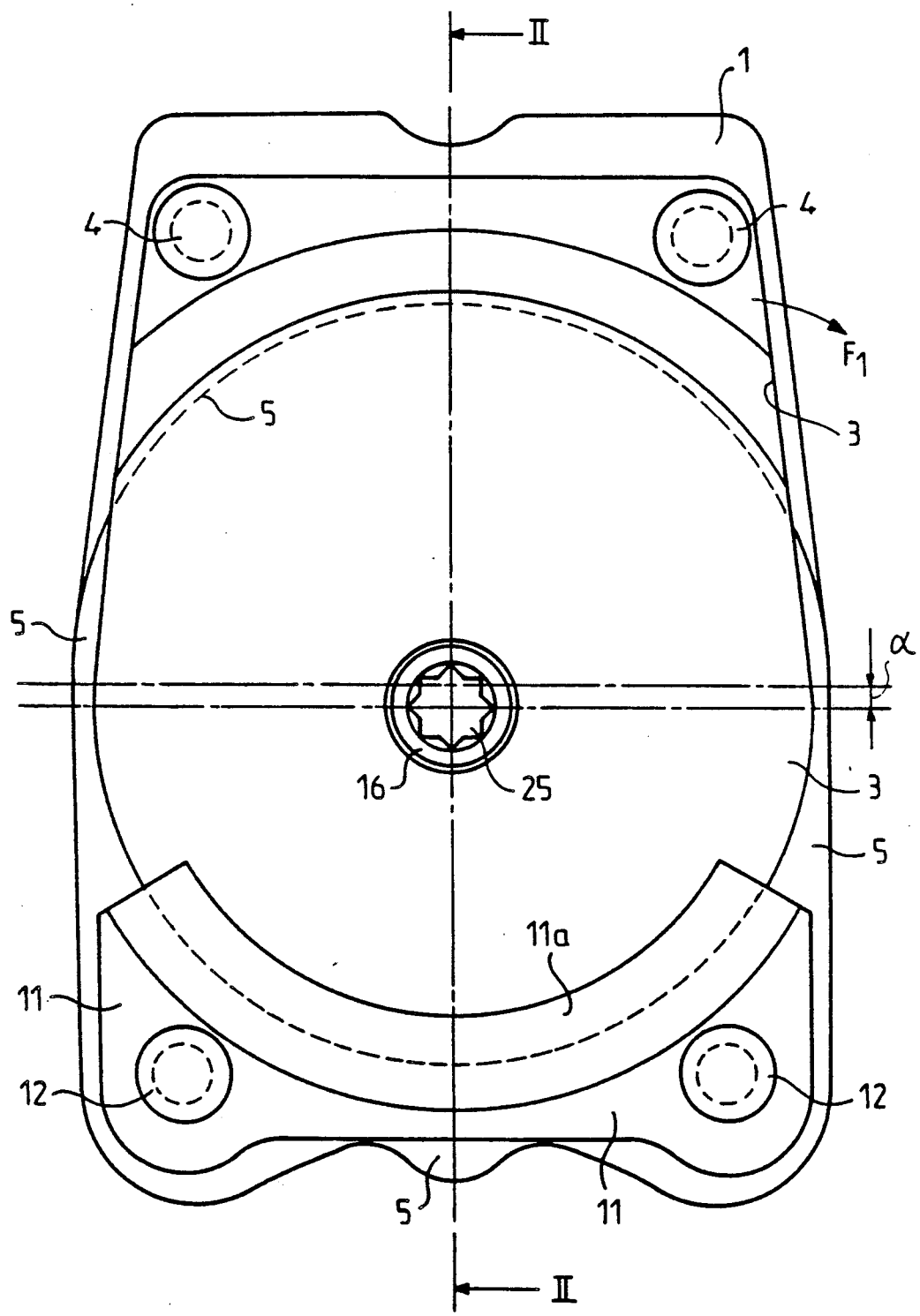
FIG. 1 is a front view of the articulation ready to be mounted on a seat.

Referring now to the drawings, FIG. 1 shows a mobile flange 1 which is fixed on the lower portion of an armature of the seat back of a seat by any suitable means. In cross section (FIG. 2), the mobile flange 1 has a central circular portion 1a which is offset rearwardly with respect to the peripheral border 1b so that a circular toothing 2 will appear on the inner face of the peripheral border 1b, 2.

This circular toothing 2 is most often made by a fine cut operating, that is a stamping of a plane metal sheet plate providing, after this stamping step, for the central circular portion 1a and the peripheral border 1b. The front face of the mobile flange 1 carries at its upper portion a casing 3 which is fixed on the upper portion of the peripheral border 1b by rivets 4.

Figure 2:
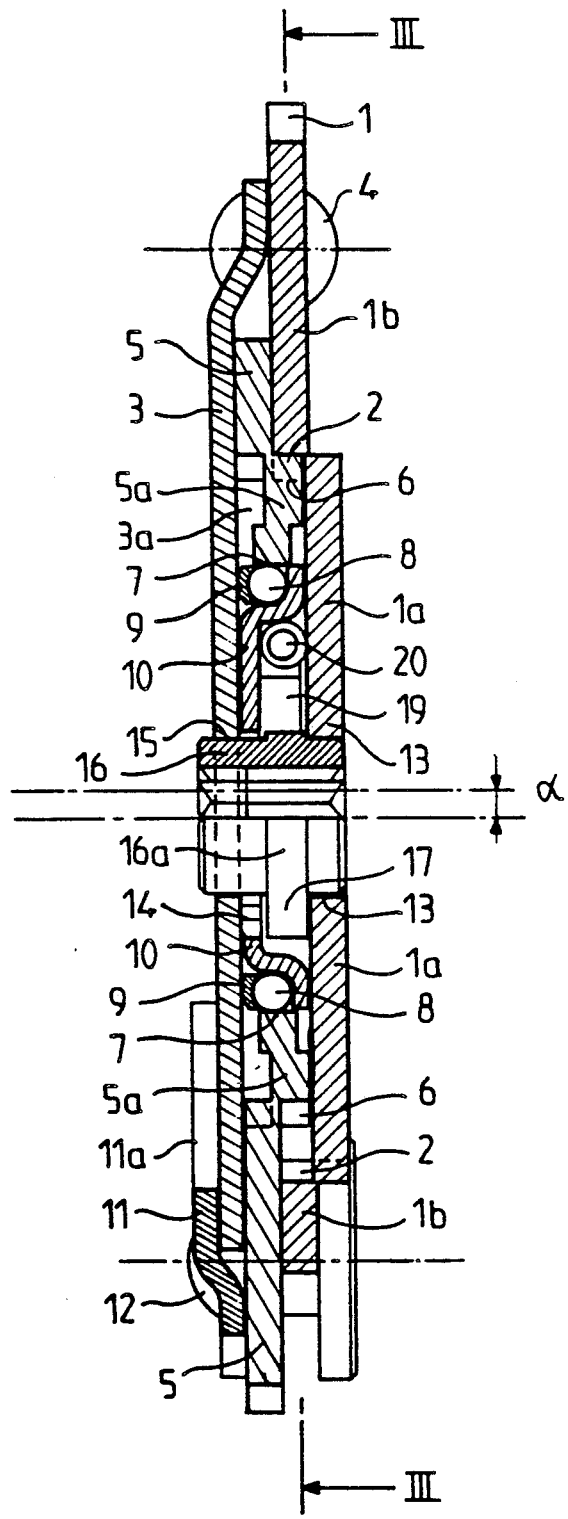
FIG. 2 is a cross sectional view along line II—II of FIG. 1.

As shown in FIG. 2, the casing 3 is deformed so as to provide a sufficient free space between the mobile flange 1 and its rear face 3a. This space is occupied by a fixed flange 5 which is rigidly connected to the armature of the sitting portion of the seat and which comprises, in its central circular zone 5a, an outer toothing 6 adapted for cooperating with the toothing 2 of the mobile flange 1. Moreover, in the center of the fixed flange 5, there is formed a circular opening 7 adapted for containing a ball bearing 8 retained by a cage 9 and a dish 10.

At the lower portion of the fixed flange 5, rigidly connected to the sitting portion of the seat, is mounted a shaped lower guide 11 which is rigidly connected to this fixed flange 5 by means of rivets 12. The shaped lower guide 11 retains and guides the lower portion of the casing 3 (see FIG. 1) and has a recessed circular upper shape 11a.

Finally, the mobile flange 1 has a hole forming a bearing 13, while the dish 10 is formed with a hole 14 of a large diameter and the casing 3 is also formed with a hole 15, the two holes 14 and 15 being substantially in alignment so as to enable passage of a central spindle 16 having a central zone provided with a collar 16a having a finger 17. The central hole 14 of the dish 10 enables passage of the collar 16a.

Figure 3:
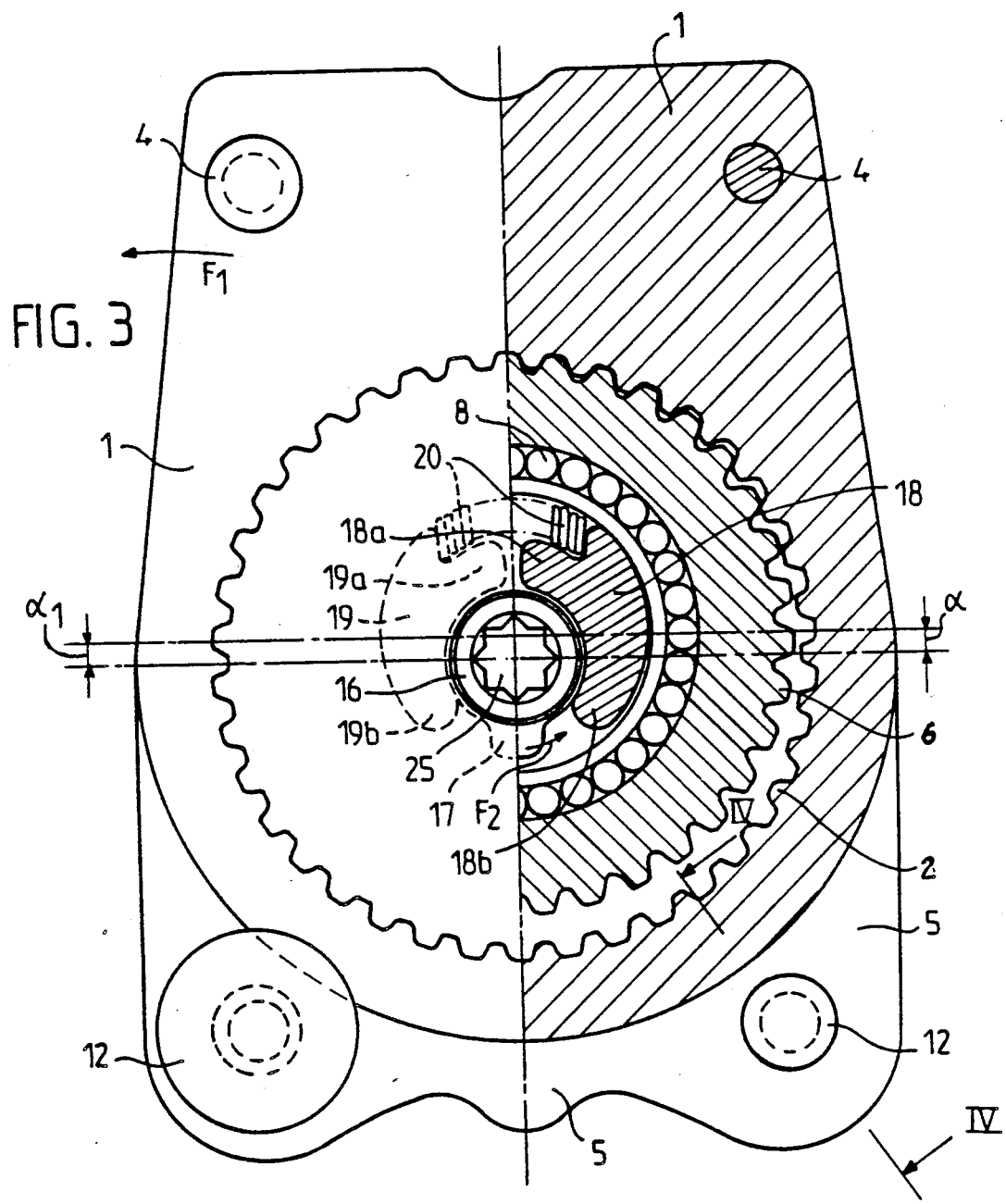
FIG. 3 is a front view, partly in cross section along line III—III of FIG. 2.
Figure 4:
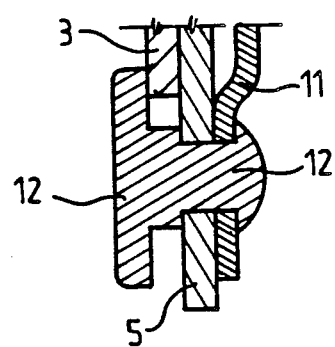
FIG. 4 is a cross sectional view along line IV—IV of FIG. 3.

The front face of the dish 10 contains two elements 18, 19 each forming a half-cam, which are formed in their upper portion with cut-outs 18a, 19a in order to house a semi-circular spring 20, while the heels 18b, 19b of the half-cams 18, 19 are rounded and are each situated at a distance from the finger 17. In FIG. 3, the spring 20 is shown in the compressed state.

Normally, the excentricity of the fixed toothing 6 with respect to the mobile toothing 2 is expressed by a distance $a$ (see FIGS. 1, 2 and 3).

During mounting, the central space of the mobile flange 1 receives the dish 10 which retains the ball bearing 8 and its cage 9 as well as the two half-cams 18, 19 and the spring 20. The central spindle 16 is placed in such manner that the collar 16a is situated in the hole 14 of the dish 10, and the position of the finger 17 is such that at that moment the excentricity $a$ is reduced, meaning that the distance $a_1$ is less than the distance $a$ (see FIG. 3); the half-cams 18, 19 are therefore pressed toward one another by compressing the spring 20, which enables a setting in position of the fixed flange 5, the fixed toothing 6 of which will easily enter into the toothing 2 of the mobile flange 1. The toothing 6 of the fixed flange 5 has a smaller diameter than the toothing 2 of the mobile flange 1 (see FIG. 3), but they have both an identical module.

The central spindle 16 is then pushed back in the position of FIG. 2 and the collar 16a is offset, the two half-cams 18, 19 assuming then their normal position (see FIG. 2). The spring 20 is released. The excentricity is then maximum, meaning normal and equal to $a$.

Once the fixed flange 5 and mobile flange 1 are mounted, they are maintained one against the other by first placing the casing 3 on the mobile flange 1, then the lower guide 11 on the first flange 5.

The central spindle 16 is an hollow and fluted spindle as shown at 25 in the drawings. It is then possible to put in position a shaft of polygonal cross section in the hole 25 of the spinddle 16 and thereby to control the sole articulation placed on one side of the seat, or the two articulations placed on either side of the seat, either by hand or via a motive member (electric motor or other).

When the shaft placed in the hole 25 of the central spindle 16 is rotatively driven, there is created a circular displacement of the fixed toothing 6 of the fixed flange 5, and there is therefore produced an angular displacement of the mobile flange 1 due to entrainment of the toothings 6 and 2. The mobile flange 1 moves for example in the direction of arrow F1 (FIG. 3), but because of the manufacturing tolerance plays, it happens that this movement causes quickly a hard point, so that the rotation of the central spindle 16 is more difficult. The finger 17 moves then to the right (arrow F2, FIG. 3), presses the half-cam 18 by compressing the spring 20, then the top terminal end of the heel 18a of the half-cam 18 meets the top terminal end or the heel 19a of the half-cam 19, thereby causing a slight modification of the primary excentration, the excentration $a$ is then reduced to $a_1$, so that there appears, by a backward motion of the fixed toothing 6 of the fixed flange 5, a disengagement of the fixed and mobile toothings 6 and 2 of the fixed flange 5 and mobile 1 flange, respectively. It is then easy to pass over the hard point in consideration which, as soon as the presence is reduced, will cause, under impulse of the spring 20 which is slightly released, a setting back in position of the two half-cams 18, 19, and the members will therefore resume their positions shown in FIG. 3.

The finger 17 is once again centered and the spring 20 is slightly decompressed. This movement causes also the return to the normal excentration $a$, as shown in the drawing.

All the plays caused by the manufacturing tolerances can thereby be compensated, and even the wear of the toothings, that is the toothing 6 of the fixed flange 5 as well as the toothing 2 of the mobile flange 1. The rotation of the articulation is therefore continuous without the user noticing hard points.

Finally, it should be noted that the mobile flange 1 moves according to an oscillating movement due to the excentration of the cam formed by the half-cams 18, 19 acting on the mobile flange 1 with respect to the fixed flange 5. Consequently, the seat back of the seat in consideration accomplishes a simultaneous up and down and reciprocating movement from front the rear during the setting in inclination of the seat back.

I claim:

1. A satellite-free continuous articulation including a play take-up device, comprising:
    a mobile flange which is rigidly connected to the seat back of a seat and has a central portion that is provided with a hollow stamped portion having a main border with a first circular toothing;
    a fixed flange which is rigidly connected to the sitting portion of said seat and has a central circular zone, an outer portion of which carries a toothing that has a smaller diameter than does said first circular toothing and is adapted to cooperate therewith, said central zone of said fixed flange having a circular opening;
    a dish placed in said circular opening for receiving a ball bearing retained by a cage;
    a spindle that has a central collar and extends through said dish;
    two half-cams placed inside said dish concentrically with respect to said spindle, with said half-cams being separated from one another at respective upper ends thereof by an arcuate spiral spring, and with said two half-cams having respective lower portions that define a space in which can move a finger that is rigidly connected to said central spindle, which receives an articulation control shaft so as to form an assembly that, when mounted, makes it possible to pass over hard points via a displacement of said two half-cams toward one another, accompanied by compression of said spring, under the effect of a thrust imparted by said finger onto one of said half-cams so as to reduce an eccentricity of said toothing of said fixed flange relative to said toothing of said mobile flange;
    a casing rigidly connected to said mobile flange for retaining said assembly; and
    a lower hollow guide that is rigidly connected to said fixed flange and retains a lower portion of said casing.

2. A continuous articulation as set forth in to claim 1, wherein the central spindle (16) is fluted in order to receive a fluted control shaft, for connecting together two articulations and providing jointly for a setting in inclination of the seat back of said seat.

* * * * *